(12) United States Patent
Kashiwagi et al.

(10) Patent No.: US 10,667,217 B2
(45) Date of Patent: May 26, 2020

(54) INFORMATION PROCESSING DEVICE, ELECTRONIC DEVICE, AND CONTROL METHOD FOR INFORMATION PROCESSING DEVICE

(71) Applicant: SHARP KABUSHIKI KAISHA, Sakai, Osaka (JP)

(72) Inventors: Tohru Kashiwagi, Sakai (JP); Shinya Okuda, Sakai (JP); Akihiro Isoo, Sakai (JP); Tomoki Kato, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/087,620

(22) PCT Filed: Feb. 7, 2017

(86) PCT No.: PCT/JP2017/004446
§ 371 (c)(1),
(2) Date: Sep. 21, 2018

(87) PCT Pub. No.: WO2017/163637
PCT Pub. Date: Sep. 28, 2017

(65) Prior Publication Data
US 2019/0053163 A1 Feb. 14, 2019

(30) Foreign Application Priority Data
Mar. 25, 2016 (JP) .................. 2016-062767

(51) Int. Cl.
*H04M 1/00* (2006.01)
*H04W 52/02* (2009.01)
(Continued)

(52) U.S. Cl.
CPC ......... *H04W 52/0254* (2013.01); *G01P 13/04* (2013.01); *G06F 1/1694* (2013.01);
(Continued)

(58) Field of Classification Search
CPC .. H04W 52/0254; G01P 13/04; G06F 1/3206; H04M 1/00
(Continued)

(56) References Cited

U.S. PATENT DOCUMENTS

2014/0221051 A1 8/2014 Oguri
2014/0288681 A1 9/2014 Watanabe
(Continued)

FOREIGN PATENT DOCUMENTS

CN 104056443 A 9/2014
CN 104571529 A 4/2015
(Continued)

OTHER PUBLICATIONS

Co-pending letter regarding related co-pending U.S. Appl. No. 15/572,462 and U.S. Appl. No. 16/087,631.
(Continued)

*Primary Examiner* — Huy C Ho
(74) *Attorney, Agent, or Firm* — ScienBiziP, P.C.

(57) ABSTRACT

An embodiment of the present invention provides an information processing device which reduces the possibility of a false detection of lifting of an electronic device. A standstill determination section (63) determines that a standstill condition is satisfied in a case where a dispersion of acceleration detected by an acceleration sensor (11) is (i) within a predetermined standstill reference range and (ii) outside a predetermined complete standstill reference range. Then, in a case where the standstill determination section (63) determines that the standstill condition is satisfied, a lifting determination section determines that an electronic device (1) has been lifted.

9 Claims, 7 Drawing Sheets

(51) Int. Cl.
- *G06F 1/3231* (2019.01)
- *G06F 1/16* (2006.01)
- *H04M 1/725* (2006.01)
- *G01P 13/04* (2006.01)
- *G06F 1/3206* (2019.01)

(52) U.S. Cl.
CPC .......... *G06F 1/3206* (2013.01); *G06F 1/3231* (2013.01); *H04M 1/00* (2013.01); *H04M 1/72522* (2013.01); *G06F 2200/1637* (2013.01); *H04M 2250/12* (2013.01)

(58) Field of Classification Search
USPC ........................................................ 455/550.1
See application file for complete search history.

(56) References Cited

U.S. PATENT DOCUMENTS

| | | | | |
|---|---|---|---|---|
| 2014/0349632 | A1* | 11/2014 | Chan | H04W 8/22 455/418 |
| 2015/0354967 | A1* | 12/2015 | Matsushita | G01C 21/16 702/150 |

FOREIGN PATENT DOCUMENTS

| | | |
|---|---|---|
| JP | 2007-080219 A | 3/2007 |
| JP | 2009-236535 A | 10/2009 |
| JP | 2010-009498 A | 1/2010 |
| JP | 2013-069027 A | 4/2013 |
| JP | 2013-232816 A | 11/2013 |
| JP | 2013-232826 A | 11/2013 |
| JP | 2014-038037 A | 2/2014 |
| JP | 2015-061299 A | 3/2015 |

OTHER PUBLICATIONS

Office Action for U.S. Appl. No. 15/572,462; dated May 9, 2019.
Final Office Action dated Nov. 12, 2019, against the co-pending U.S. Appl. No. 15/572,462.
Advisory Action dated Feb. 26, 2020 for U.S. Appl. No. 15/572,462.

* cited by examiner

INFORMATION PROCESSING DEVICE, ELECTRONIC DEVICE, AND CONTROL METHOD FOR INFORMATION PROCESSING DEVICE

TECHNICAL FIELD

The present invention relates to an information processing device, an electronic device, a method for controlling the information processing device, and a control program for the information processing device.

BACKGROUND ART

Recent mobile terminals (electronic devices), typically, smartphones include various sensors and are becoming multifunctional. For example, Patent Literature 1 discloses a mobile terminal which includes an authenticating section and a posture detecting section. In a case where authentication of an object by the authenticating section has succeeded, the mobile terminal activates an application which corresponds to a housing posture which has been detected by the posture detecting section.

CITATION LIST

Patent Literature

[Patent Literature 1] Japanese Patent Application Publication, Tokukai, No. 2013-232816 (Publication Date: Nov. 14, 2013)

SUMMARY OF INVENTION

Technical Problem

The mobile terminal disclosed in Patent Literature 1 detects a state in which the mobile terminal is lifted (a posture of the mobile terminal), for example, on the basis of a result of detection by an acceleration sensor. However, the technique disclosed in Patent Literature 1 is not sufficient to prevent a false detection of lifting of the mobile terminal. Accordingly, it is highly likely that a false detection occurs. When a false detection occurs, some operation based on a result of detection by an acceleration sensor is carried out although a user performs no operation. This results in a problem of an increased power consumption of a mobile terminal.

In view of the above problem, the present invention has been attained. An object of the present invention is to provide an information processing device, an electronic device, a method for controlling the information processing device, and a control program for the information processing device, each of which can decrease the possibility of a false detection which causes a function associated with lifting to be activated at a time which is not intended by a user.

Solution to Problem

In order to solve the above problem, an information processing device in accordance with an aspect of the present invention is an information processing device mounted on an electronic device, including: a standstill determination section for determining whether or not a predetermined standstill condition is satisfied, on the basis of an acceleration detected by an acceleration sensor provided in the electronic device; and a lifting determination section for determining whether or not the electronic device has been lifted, the standstill determination section determining that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state, and the lifting determination section determining that the electronic device has been lifted, in a case where, after the acceleration satisfies a predetermined lifting acceleration condition, the standstill determination section determines that the standstill condition is satisfied.

Moreover, in order to solve the above problem, an information processing device in accordance with an aspect of the present invention is an information processing device mounted on an electronic device, including: an impact determination section for determining whether or not a predetermined non-impact acceleration condition is satisfied, on the basis of an acceleration detected by an acceleration sensor provided in the electronic device; and a lifting determination section for determining whether or not the electronic device has been lifted, the impact determination section determining that the non-impact acceleration condition is satisfied, in a case where the acceleration is within a predetermined non-impact reference range, and the lifting determination section determining that the electronic device has been lifted, in a case where (i) the acceleration satisfies a predetermined lifting acceleration condition and (ii) the impact determination section determines that the non-impact acceleration condition is satisfied.

Further, in order to solve the above problem, an information processing device in accordance with an aspect of the present invention is an information processing device mounted on an electronic device, including: an initial angle determination section for determining whether or not an angle of a display surface of the electronic device with respect to a horizontal plane satisfies a predetermined initial angle condition, on the basis of an acceleration detected by an acceleration sensor provided in the electronic device; an initial standstill determination section for determining, on the basis of the acceleration, whether or not a predetermined initial standstill condition is satisfied; and a lifting determination section for determining whether or not the electronic device has been lifted, the initial standstill determination section determining that the initial standstill condition is satisfied, in a case where a dispersion of the acceleration is within a predetermined initial standstill reference range, and the lifting determination section carrying out a process for determining whether or not the electronic device has been lifted, in a case where the initial angle condition and the initial standstill condition are satisfied.

Further, in order to solve the above problem, an information processing device in accordance with an aspect of the present invention is an information processing device mounted on an electronic device, including: a horizontality determination section for determining whether or not a display surface of the electronic device is at an angle in a state in which the display surface is substantially parallel to the horizontal plane, on the basis of an acceleration detected by an acceleration sensor provided in the electronic device; a standstill determination section for determining, on the basis of the acceleration, whether or not a predetermined standstill condition is satisfied; and a lifting determination section for determining whether or not the electronic device has been lifted, the standstill determination section determining that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state, and the lifting determination section determining that the electronic device has been lifted, in a case where, after the angle changes from the angle in the state in which the display surface is substantially parallel to the horizontal plane to a different an the standstill determination section determines that the standstill condition is satisfied.

Further, in order to solve the above problem, a control method in accordance with an aspect of the present invention is a method for controlling an information processing device mounted on an electronic device, including: a standstill determination step of determining whether or not predetermined standstill condition is satisfied, on the basis of an acceleration detected by an acceleration sensor provided in the electronic device; and a lifting determination step of determining whether or not the electronic device has been lifted, in the standstill determination step, it being determined that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state, and in the lifting determination step, it being determined that the electronic device has been lifted, in a case where, after the acceleration satisfies a predetermined lifting acceleration condition, it is determined in the standstill determination step that the standstill condition is satisfied.

Advantageous Effects of Invention

An aspect of the present invention advantageously makes it possible to decrease the possibility of a false detection which causes a function associated with lifting to be activated at a time which is not intended by a user.

DESCRIPTION OF EMBODIMENTS

Embodiment 1

(Overview of Mobile Terminal 1)

The following description will discuss details of Embodiment 1 of the present invention, with reference to FIGS. 1 to 5. A mobile terminal (electronic device) 1 in accordance with Embodiment 1 carries out various kinds of processing, for example, processing to turn on a touch panel, processing to power up the mobile terminal 1, and/or the like, on the basis of a result of lifting determination in which it is determined whether or not the mobile terminal 1 has been lifted. The mobile terminal 1 has a plurality of modes such as a normal mode, a horizontal mode in which lifting determination is carried out in a case where an initial state of the mobile terminal 1 is a horizontal state, and/or the like. In Embodiment 1, the following will discuss an example of lifting determination in the normal mode.

Figure 2:
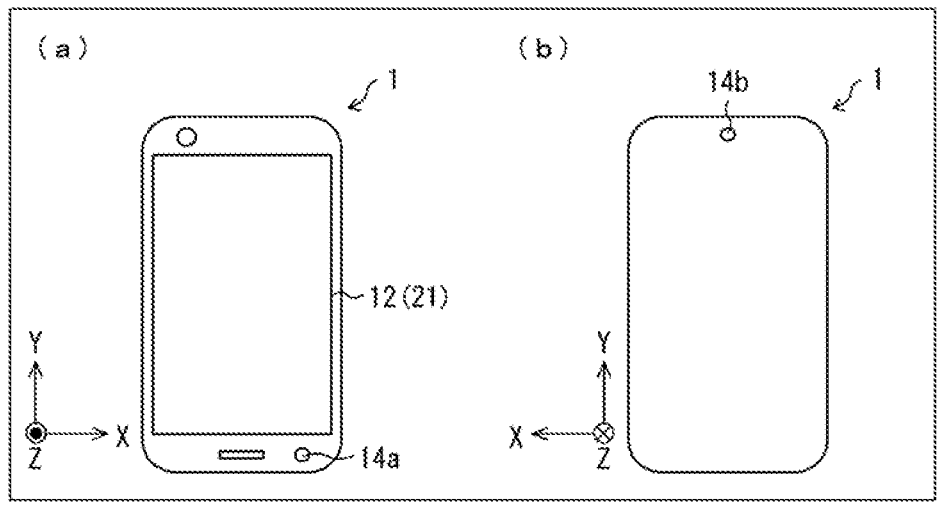
FIG. 2 is a view illustrating an appearance of the mobile terminal. (a) of FIG. 2 is a view illustrating a front side of the mobile terminal, and (b) of FIG. 2 is a view illustrating a back side of the mobile terminal.

First, the following will discuss an appearance of the mobile terminal 1, with reference to FIG. 2. FIG. 2 is a view illustrating an appearance of the mobile terminal 1. (a) of FIG. 2 is a view illustrating a front side (touch panel 12 side) of the mobile terminal 1, and (b) of FIG. 2 is a view illustrating a back side (a side opposite to a touch panel 12) of the mobile terminal 1.

As illustrated in FIG. 2, Embodiment 1 assumes that the mobile terminal 1 is a smartphone. However, the mobile terminal 1 is not limited to smartphones, and may be any portable electronic device or the like, for example, a mobile phone, a portable information terminal, a portable television or a portable personal computer. The mobile terminal 1 has a front surface and a back surface which are provided with proximity sensors 14a and 14b, respectively. The proximity sensors 14a and 14b each detect proximity of an object. Hereinafter, the proximity sensors 14a and 14b are collectively called proximity sensors 14.

(Hardware Configuration of Mobile Terminal 1)

Figure 3:
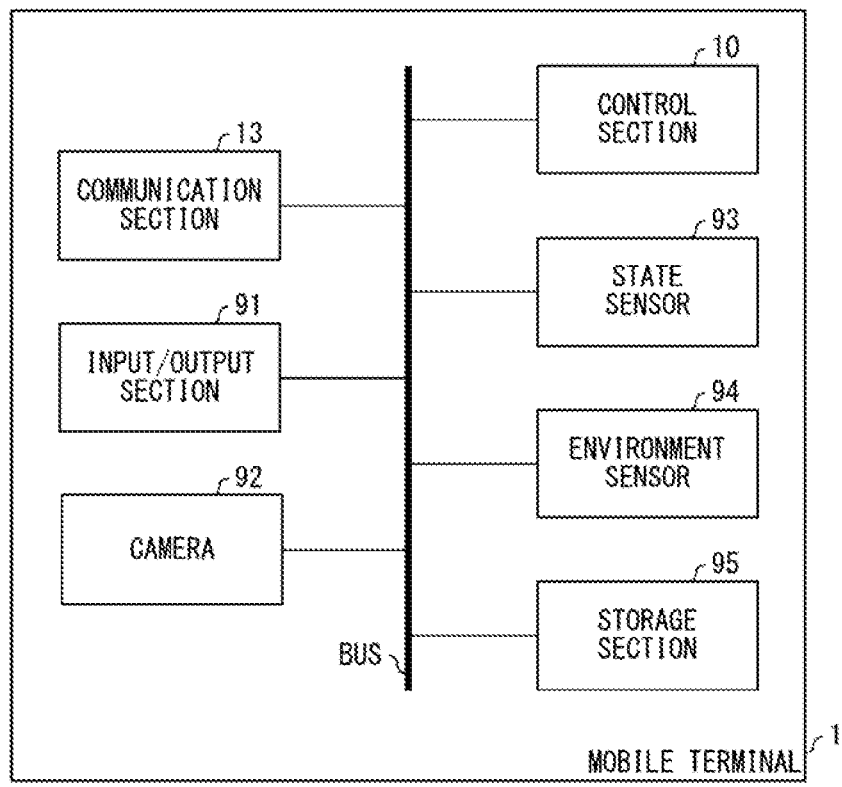
FIG. 3 is a diagram illustrating a hardware configuration of the mobile terminal.

Next, the following will discuss a hardware configuration of the mobile terminal 1, with reference to FIG. 3. FIG. 3 is a view illustrating a typical hardware configuration of the mobile terminal 1. As illustrated FIG. 3, the mobile terminal 1 includes a control section 10, a communication section 13, an input/output section 91, a camera 92, a state sensor 93, an environment sensor 94, and a storage section 95, each of which is connected to a system bus.

The control section 10 carries out overall control of the above sections of the mobile terminal 1. The function of the control section 10 may be realized by causing a central processing unit (CPU) to execute a program stored in the storage section 95. Further, the control section 10 carries out lifting determination for detecting whether or not the mobile terminal 1 has been lifted. Then, in a case where lifting is detected, the control section 10 executes a function associated with lifting.

The communication section 13 is a communication interface which is used when the mobile terminal 1 carries out communication (wired communication or wireless communication) with an external device. The storage section 95 stores various programs to be executed by the control section 10 and data to be used by the control section 10 to execute the programs. The input/output section 91 receives an input operation of a user. At the same time, the input/ output section 91 serves as a member for presenting various kinds of information to a user. The input/output section 91 corresponds to the touch panel 12 (described later). The camera 92 captures a moving image in response to a command from the control section 10. The state sensor 93 detects various states of the mobile terminal 1. Examples of the state sensor 93 encompass not only an acceleration sensor 11 described below, but also a gyro sensor, a geomagnetic sensor, an air pressure sensor, and/or the like. The environment sensor 94 detects circumstances around the mobile terminal 1. Examples of the environment sensor 94 encompass a brightness sensor (illuminance sensor) etc., in addition to the above described proximity sensor 14.

(Main Part Configuration of Mobile Terminal 1)

Figure 1:
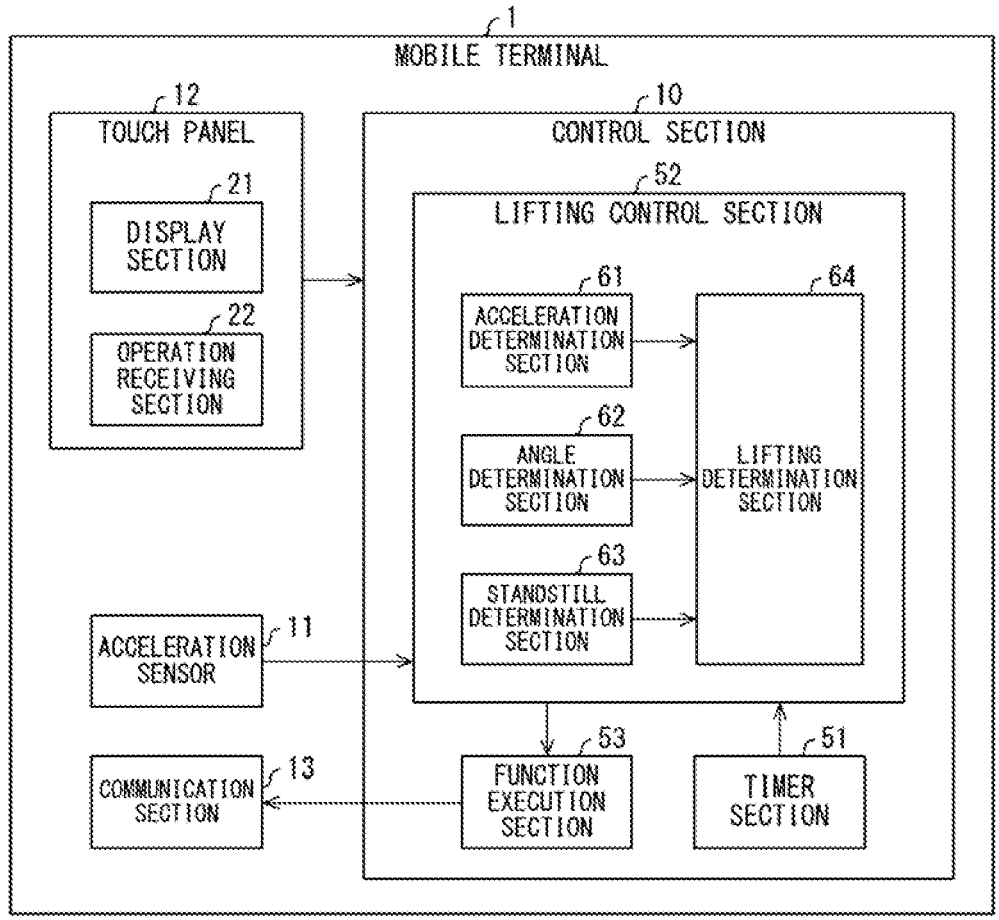
FIG. 1 is a block diagram illustrating a main part configuration of a mobile terminal in accordance with Embodiment 1 of the present invention.

Next, the following will discuss a main part configuration of the mobile terminal 1, with reference to FIG. 1. FIG. 1 is a block diagram illustrating a main part configuration of the mobile terminal 1. As illustrated in FIG. 1, the mobile terminal 1 includes the control section 10, the acceleration sensor 11, the touch panel 12, and the communication section 13.

The acceleration sensor 11 detects accelerations along directions of three axes orthogonal to one another. It is assumed that (i) an X direction (X axis) is along a short-side direction of a display section (display surface) 21 of the touch panel 12, (ii) Y direction (Y axis) is along a longitudinal direction of the display section 21, and a Z direction (Z axis) is along a direction from the back side to the front side of the display section 21 (see FIG. 2 described above)

The following provides an explanation using such an xyz orthogonal coordinate system. Hereinafter, respective accelerations in the X direction, the Y direction and the Z direction may be referred to as AX, AY and AZ. Moreover, the acceleration sensor 11 further detects a synthetic acceleration (hereinafter, referred to as V or synthetic acceleration V) obtained by synthesizing the respective accelerations AX, AY, and AZ in the X, Y, and Z directions. The control section 10 is notified of a result of detection by the acceleration sensor 11. Note that the control section 10 can detect a horizontal plane (plane perpendicular to a direction of gravitational force), on the basis of the result of detection by the acceleration sensor 11.

The touch panel 12 not only displays information but also receives an operation of a user with respect to the mobile terminal 1. The touch panel 12 includes a display section 21 and an operation receiving section 22. The display section 21 displays various kinds of information. The operation receiving section 22 receives an operation of a user when the user touches the operation receiving section 22 with his/her finger, bringing user's finger in proximity to the operation receiving section 22, or the like. The touch panel 12 is configured to include the display section 21 and the operation receiving section 22, which are superimposed on top of each other and integrated with each other.

The control section 10 includes a timer section 51, a lifting control section (information processing device) 52, and a function execution section 53.

The timer section 51 counts up time, and notifies the lifting control section 52 of the time.

The lifting control section 52 determines whether or not the mobile terminal 1 has been lifted, on the basis of the accelerations detected by the acceleration sensor 11. The lifting control section 52 includes an acceleration determination section (impact determination section) 61, an angle determination section (initial angle determination section, angle calculation section, horizontality determination section) 62, a standstill determination section (initial standstill determination section) 63, and a lifting determination section 64.

The acceleration determination section 61 determines whether or not a predetermined acceleration condition (including a lifting acceleration condition and a non-impact acceleration condition) is satisfied, on the basis of an acceleration(s) detected by the acceleration sensor 11. For example, the acceleration determination section 61 determines whether or not the acceleration detected by the acceleration sensor 11 satisfies a predetermined lifting acceleration condition and the non-impact acceleration condition. Then, the acceleration determination section 61 notifies the lifting determination section 64 of a result of such determination.

In a case where the acceleration detected by the acceleration sensor 11 satisfies, for example, the following conditions (1) to (3), the acceleration determination section determines that the lifting acceleration condition is satisfied (see 4 which will be described later). (1) A waveform showing a change in acceleration over time in a predetermined period has a maximum value and a minimum value. (2) The acceleration is higher than a threshold Th1 during a predetermined time period T1 including a time point (Ma) at which the acceleration is the maximum value. (3) The acceleration is lower than a threshold Th2 during a predetermined time period T2 including a time point (Mb) at which the acceleration is the minimum value. The above lifting acceleration condition is set in view of a change in acceleration over time in a case where movement for lifting (lifting motion) of the mobile terminal 1 is made.

Further, in a case where the acceleration detected by the acceleration sensor 11 is within a predetermined non-impact reference range, the acceleration determination section 61 determines that the non-impact acceleration condition is satisfied.

The angle determination section 62 calculates an angle of the display section 21 with respect to the horizontal plane, on the basis of the acceleration detected by the acceleration sensor 11, and determines whether or not the angle of the mobile terminal 1 satisfies a predetermined angle condition (including an initial angle condition and a holding angle condition).

For example, the angle determination section 62 determines whether or not the angle of the mobile terminal 1 satisfies a predetermined initial angle condition (conditions for determining a non-45° state), on the basis of the acceleration detected by the acceleration sensor 11. Then, the angle determination section 62 notifies the lifting determination section 64 of a result of this determination.

Further, after the acceleration determination section 61 determines that the lifting acceleration condition and the non-impact acceleration condition are satisfied, the angle determination section 62 determines, with use of the acceleration detected by the acceleration sensor 11, whether or not the angle of the mobile terminal 1 satisfies a predetermined holding angle condition (whether or not the angle is within a predetermined holding angle reference range). Then, the angle determination section 62 notifies the lifting determination section 64 of a result of this determination. The predetermined holding angle reference range is, for example, an angle range (e.g., not less than 15° and not more than 68°) including an angle of 45° which the Y axis makes with the horizontal plane. The predetermined holding angle reference range may be understood, for example, as an angle range in a case where a user lifts the mobile terminal 1 and views the display section 21. A state (posture) of the mobile terminal 1 whose angle is within the predetermined holding angle reference range may be referred to as "45° state". In contrast, a state (posture) of the mobile terminal 1 whose angle is outside the predetermined holding angle reference range may be referred to as "non-45° state".

The standstill determination section 63 determines whether or not the mobile terminal 1 is in a predetermined standstill state, on the basis of the acceleration detected by the acceleration sensor 11.

For example, the standstill determination section 63 determines whether or not the state of the mobile terminal 1 satisfies a predetermined initial standstill condition, with use of the acceleration detected by the acceleration sensor 11. Then, the standstill determination section 63 notifies the lifting determination section 64 of a result of this determination.

Further, after the angle determination section 62 determines that the holding angle condition is satisfied, the standstill determination section 63 determines, with use of the acceleration detected by the acceleration sensor 11, whether or not the mobile terminal 1 is in a standstill state (whether or not the mobile terminal 1 satisfies the standstill condition) while the mobile terminal 1 keeps satisfying the holding angle condition. Then, the standstill determination section 63 notifies the lifting determination section 64 of a result of this determination.

The lifting determination section 64 determines whether or not the mobile terminal 1 has been lifted, on the basis of the above results of determination from the acceleration determination section 61, the angle determination section 62, and the standstill determination section 63. Then, the lifting determination section 64 notifies the function execution section 53 of a result of this determination. Note that the details of a process carried out in the lifting control section 52 will be discussed below.

In a case where the lifting determination section 64 determines that the mobile terminal 1 has been lifted, the function execution section 53 executes a corresponding function. The corresponding function may be any function associated with lifting of the mobile terminal 1, for example, a function to turn on display of the display section 21 (make display of the display section 21 bright), a function to turn on the mobile terminal 1, a function to start communicating with another device, and/or the like.

(Details of Processing in Lifting Control Section 52)

Figure 4:
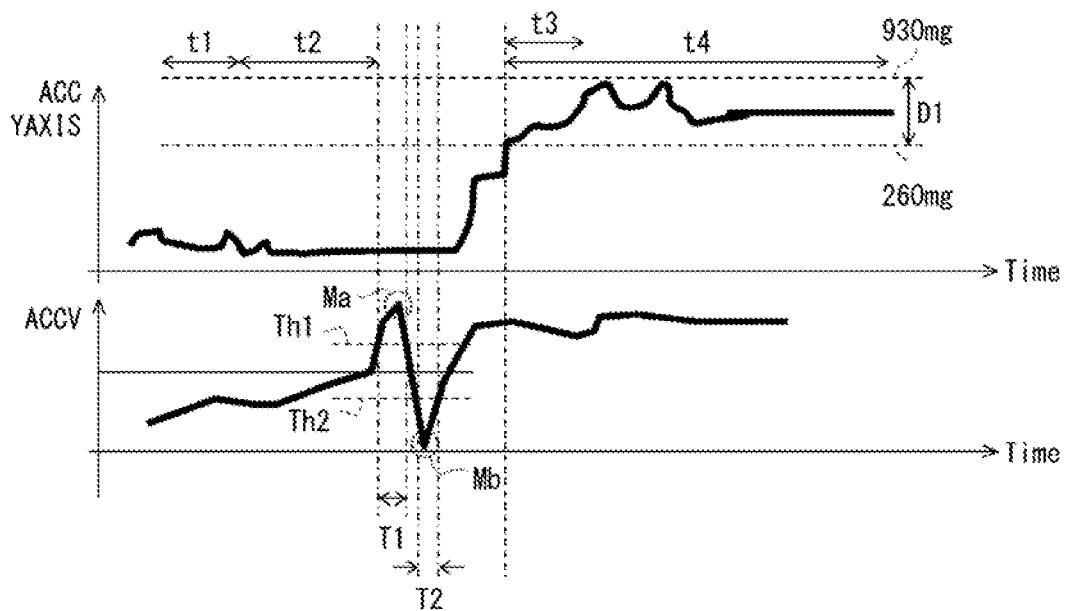
FIG. 4 is a diagram for explaining how lifting is detected in the mobile terminal.

Next, the following will discuss the details of processing in the lifting control section 52, with reference to FIG. 4. FIG. 4 is a diagram for explaining how lifting is detected. Note that numerical values below are merely examples, and such numerical values may be changed as appropriate in accordance with a specification etc. of the mobile terminal 1.

First, the angle determination section 62 determines whether or not the mobile terminal 1 satisfies the predetermined initial angle condition. Specifically, the angle determination section 62 determines that the initial angle condition is satisfied and the mobile terminal 1 is in the non-45° state, in a case where the accelerations satisfy the following angle conditions (4) and (5) for a predetermined time period. (t1 in FIG. 4, e.g., 300 ms). Here, g represents a gravitational acceleration. (4) AX<−400 mg or AX>400 mg. (5) AY<260 mg or AY>930 mg (that is, AY is outside a range of D1 in FIG. 4). Note that there is no particular condition set for AZ.

Next, the standstill determination section 63 determines whether or not the mobile terminal 1 satisfies the predetermined initial standstill condition. Specifically, the standstill determination section 63 calculates a dispersion (standard deviation) of each of the accelerations. The dispersion indicates, for example, a deviation from an average value of the acceleration per unit time (e.g., 500 mill-seconds (ms)). Specifically, it is determined that the initial standstill condition is satisfied in a case where, while the initial angle condition is being satisfied, the dispersion (standard deviation) of each of the accelerations satisfies the following condition (6) for a predetermined time period (t2 in FIG. 4, e.g., 1 second (s)). (6) Dispersion (standard deviation) of each of accelerations AX, AY, and AZ≤100 mg (initial standstill reference range).

For example, in a case where the mobile terminal 1 is carried in a bag or the like, a change in posture of the mobile terminal 1 may occur due to successive oscillations caused by walking etc. A motion of the change in posture in this case may result in a false detection in which it is determined that the mobile terminal 1 has been lifted. In order to prevent such a false detection, the standstill determination section 63 determines whether or not the mobile terminal 1 satisfies an initial standstill condition. Then, in a case where a change in posture of the mobile terminal 1 occurs due to successive oscillations caused by walking etc., the initial standstill condition is not satisfied since the dispersion of the acceleration is outside a predetermined initial standstill reference range (in Embodiment 1, the predetermined initial standstill reference range of the dispersion (standard deviation) of each of the accelerations in AX, AY, and AZ is not more than 100 m. This makes it possible to reduce the possibility that the above-described false detection will occur. Accordingly, it is possible to reduce a power consumption associated with the false detection in the mobile terminal 1.

Next, the acceleration determination section 61 determines whether or not the acceleration detected by the acceleration sensor 11 satisfies the predetermined lifting acceleration condition. Specifically, the acceleration determination section 61 determines that the above conditions (1) to (3) of the lifting acceleration condition are satisfied in a case where the following formulae (A) to (C) are satisfied:

$$V(M) \leq 1150 \text{ mg, and } \min(V(M+1), V(M+2)) > 1150 \text{ mg} \quad (A);$$

$$V(N) < 850 \text{ mg, and } \min(V(N+1), V(N+2)) \geq 850 \text{ mg} \quad (B); \text{ and}$$

$$180 \text{ ms} \leq Tb - Ta \leq 1500 \text{ ms} \quad (C).$$

In the above formulae, V(M) represents a synthetic acceleration V at a time point M and V(N) represents a synthetic acceleration V at a time point N. Note that IM and N are each an integer of not less than 0. Further, Ta represents a time point of V(M+2) and Tb represent a time point of V(N+2). Note that (i) M+1 indicates a time point following the time point M (e.g., 50 ms after the time point M), and (ii) M+2 indicates a time point following the time point M+1 (e.g., 50 ms after the time point M+1) (the same applies to N). The formulae (A) and (B) are determination conditions for detecting the maximum value and the minimum value of V, respectively. Further, the formula (C) is a determination condition which is set in view of a manner of change (transition from the maximum value to the minimum value) in V over time.

Further, the acceleration determination section 61 determines whether or not the acceleration detected by the acceleration sensor 11 satisfies a predetermined non-impact acceleration condition as well as the lifting acceleration condition. Specifically, the acceleration determination section 61 determines that the non-impact acceleration condition is satisfied in a case where the acceleration(s) satisfies satisfy the following condition (7). (7) AX, AY, AZ (or synthetic acceleration V)<1500 mg (non-impact reference range).

When a lifting motion of the mobile terminal 1 is detected by the acceleration sensor 11, a false detection may occur. In the false detection, even in a case where the acceleration detected by the acceleration sensor 11 is caused by an impact due to a fall or the like of the mobile terminal 1, it is determined that the mobile terminal 1 has been lifted. In order to prevent such a false detection, the acceleration determination section 61 determines whether or not the acceleration detected by the acceleration sensor 11 satisfies the non-impact acceleration condition as well as the above lifting acceleration condition. Then, in a case where the acceleration detected by the acceleration sensor 11 is an acceleration caused by a strong impact due to a fall or the like of the mobile terminal 1, the non-impact acceleration condition is not satisfied. This is because the acceleration in such a case is outside the predetermined non-impact acceleration reference range (in Embodiment 1, each of all AX, AY, and AZ is less than 1500 mg or the synthetic acceleration V is less than 1500 mg). This makes it possible to reduce the possibility that the above-described false detection will occur. Accordingly, it is possible to reduce a power consumption associated with the false detection in the mobile terminal 1.

Next, the angle determination section 62 determines whether or not the mobile terminal 1 satisfies the predetermined holding angle condition. Specifically, the angle determination section 62 determines that the mobile terminal 1 is in the 45° state and satisfies the holding angle condition, in a case where the accelerations satisfy the following angle conditions (8) to (10) (conditions for determining a 45° state) for a predetermined time period (e.g., 210 ms=30 ms×7): (8) −400 mg≤AX≤400 mg; (9) 260 mg≤AY≤930 mg (that is, AY is within the range of D1 in FIG. 4); and (10) AZ>0 (where a positive direction of the Z axis corresponds to a direction from the back side to the front side of the mobile terminal 1).

Note that the condition (8) corresponds to a state in which an angle of the X axis with respect to the horizontal plane is within ±25° (or the above condition (4) corresponds to a state in which an angle of the X axis with respect to the horizontal plane is not within ±25°). Note also that the condition (9) corresponds to a state in which an angle of the Y axis with respect to the horizontal plane is within a predetermined angle range (not less than 15° and not more than 68°) (or the above condition (5) corresponds to a state in which an angle of the Y axis with respect to the horizontal plane is not within the predetermined range). Further, whether the conditions (8) to (10) are satisfied is determined a plurality of times (e.g., 7 times) at predetermined intervals (e.g., every 30 ms). Then, when the conditions (8) to (10) are satisfied in all the plurality of times of determination, it is determined that the mobile terminal 1 is in the 45° state.

Next, the standstill determination section 63 determines whether or not the mobile terminal 1 satisfies the predetermined standstill condition. Specifically, the standstill determination section 63 determines that the mobile terminal 1 satisfies the standstill condition in a case where the accelerations satisfy the following conditions (11) and (12). (11) With regard to values of each of the respective accelerations (AX, AY, and AZ) in the X direction, the Y direction and the Z direction, which accelerations are successively obtained by the acceleration sensor 11 for 210 ms at intervals of 30 ms and then supplied from the acceleration sensor 11 to the standstill determination section 63, a dispersion (standard deviation) of the values which exclude a maximum value and a minimum value is within 40 mg (standstill reference range). (12) With regard to each of the respective accelerations (AX, AY, and AZ) in the X direction, the Y direction and the Z direction, which accelerations are successively obtained by the acceleration sensor 11 for 210 ms and then supplied from the acceleration sensor 11 to the standstill determination section 63, dispersion (standard deviation) of each of the accelerations is in a range of not less than 15 mg and not more than 40 mg (incomplete standstill reference range) which range excludes a range of not less than 0 mg and less than 15 mg (complete standstill reference range).

For example, in a case where immediately after a user takes the mobile terminal 1 in his/her hand, the user puts the mobile terminal 1 on a target object without operating the mobile terminal 1, a false detection may occur in which false detection it is determined that the mobile terminal 1 has been lifted. In order to prevent such a false detection, the standstill determination section 63 determines that the standstill condition is satisfied in a case where the dispersion (standard deviation) of each of the accelerations detected by the acceleration sensor 11 is in the incomplete standstill reference range (not less than 15 mg and not more than 40 mg) which excludes the complete standstill reference range (not less than 0 mg and less than 15 mg). Then, in a case where the mobile terminal 1 is put on a target object, the mobile terminal 1 does not satisfy the standstill condition because the mobile terminal 1 is in a substantially complete standstill state (within a complete standstill reference range). This makes it possible to reduce the possibility that the above-described false detection will occur. Accordingly, it is possible to reduce a power consumption associated with the false detection in the mobile terminal 1.

Note that the standstill determination section 63 may start determining whether or not the standstill condition of the mobile terminal 1 is satisfied, after passage of a predetermined time (t3 in FIG. 4, e.g., 120 ms) from a time point at which the above-described holding angle condition was satisfied. This makes it possible to determine whether or not the standstill condition is satisfied, in a time period which excludes a period in which the state (posture) of the mobile terminal 1 is unstable. Further, the standstill determination section 63 ends determination on whether or not the standstill condition is satisfied (a process of the standstill determination times out), in a case where the standstill condition is not satisfied even after passage of a predetermined time (t4 in FIG. 4, e.g., 3.3 s) from a time point at which the standstill determination section 63 started determining whether or not the standstill condition is satisfied.

Then, when the "initial angle condition (conditions for determining a non-45° state)", the "initial standstill", the "acceleration condition", the "holding angle condition (conditions for determining a 45° state)" and the "standstill condition" are satisfied in this order, the lifting determination section 64 determines that the mobile terminal 1 has been lifted (lifting of the mobile terminal 1 is detected). Note however that the lifting determination section 64 may be configured to determine that the mobile terminal 1 has been lifted, in a case where not all but at least one of the above conditions is satisfied (e.g., in a case where only the acceleration condition is satisfied). Further, the lifting control section 52 may carry out a next lifting determination, after passage of a predetermined time from an immediately preceding lifting determination.

(Flow of Process in Mobile Terminal 1)

Figure 5:
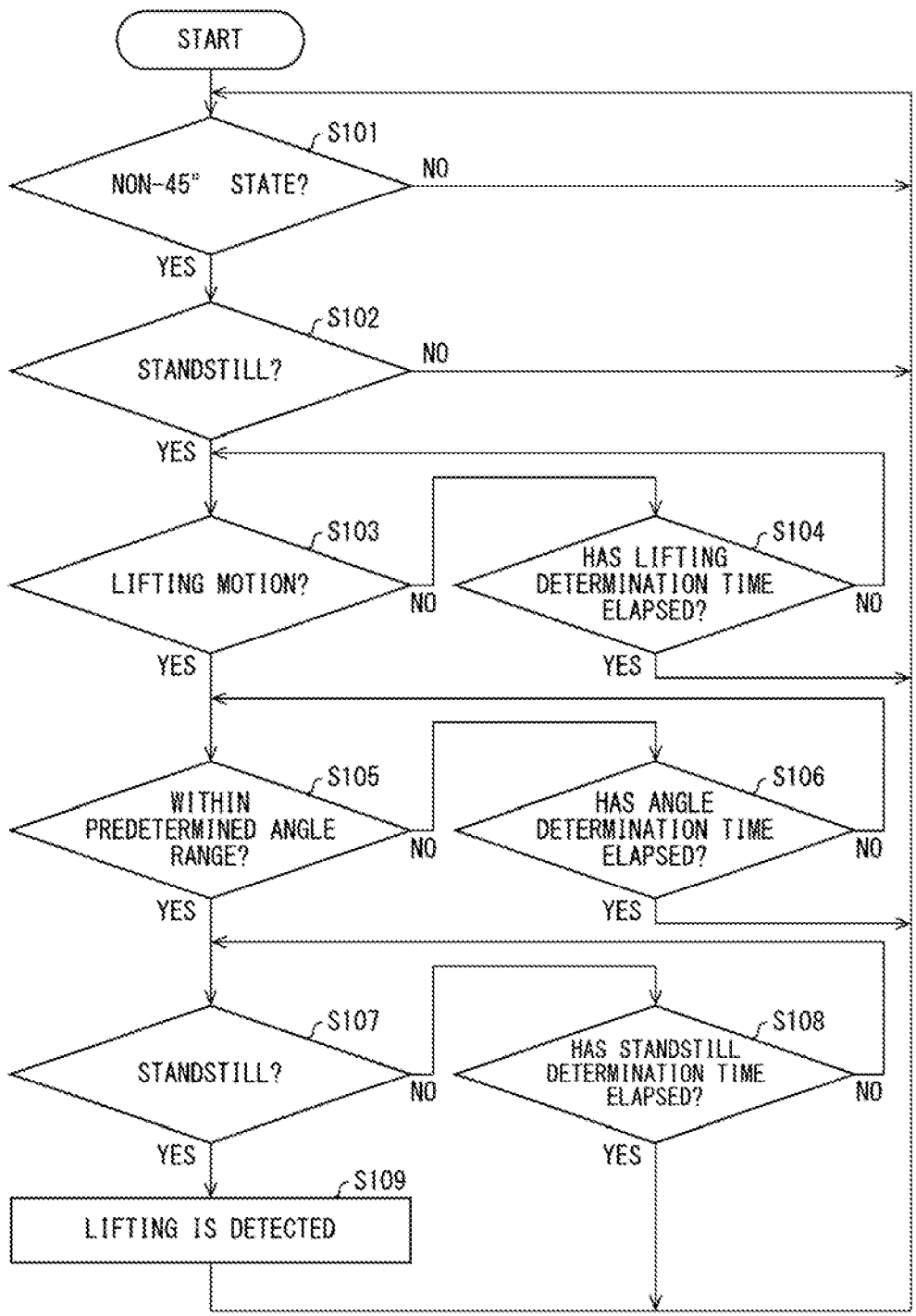
FIG. 5 is a flowchart illustrating a flow of a process in the mobile terminal.

FIG. 5 is a flowchart illustrating a flow of a process (S101 to S109) of lifting detection in the mobile terminal 1. The following will briefly discuss the flow of that process, with reference to FIG. 5. First, the angle determination section 62 determines whether or not the initial angle condition (conditions for determining a non-45° state) is satisfied (S101). In a case where the initial angle condition is satisfied (YES in S101), the standstill determination section 63 determines whether or not the initial standstill condition is satisfied (S102). In a case where the initial standstill condition is satisfied (YES in S102), the acceleration determination section 61 determines whether or not the lifting acceleration condition and the non-impact acceleration condition are satisfied (S103). In a case where the lifting acceleration condition and the non-impact acceleration condition are satisfied (YES in S103), the angle determination section 62 determines whether or not the holding angle condition (conditions for determining a 45° state) is satisfied (S105). In a case where the holding angle condition is satisfied (YES in S105), the standstill determination section 63 determines whether or not the standstill condition is satisfied (S107). In a case where the standstill condition is satisfied, the lifting determination section 64 determines that the mobile terminal 1 has been lifted (S109).

In contrast, in a case where the initial angle condition (conditions for determining a non-45° state) is not satisfied in S101 (NO in S101), the process goes back to S101. Further, in a case where the initial standstill condition is not satisfied in S102 (NO in S102), the process goes back to S101. Meanwhile, in a case where the lifting acceleration condition and the non-impact acceleration condition are not satisfied in S103 (NO in S103), the process goes back to S101 after a predetermined time (lifting determination time) has elapsed (YES in S104). In a case where the holding angle condition (conditions for determining a 45° state) is not satisfied in S105 (NO in S105), the process goes back to S101 after a predetermined time (angle determination time) has elapsed (YES in S106). In a case where the standstill condition is not satisfied in S107 (NC) in S107), the process goes back to S101 after a predetermined time (standstill determination time) has elapsed (YES in S107).

Embodiment 2

Figure 6:
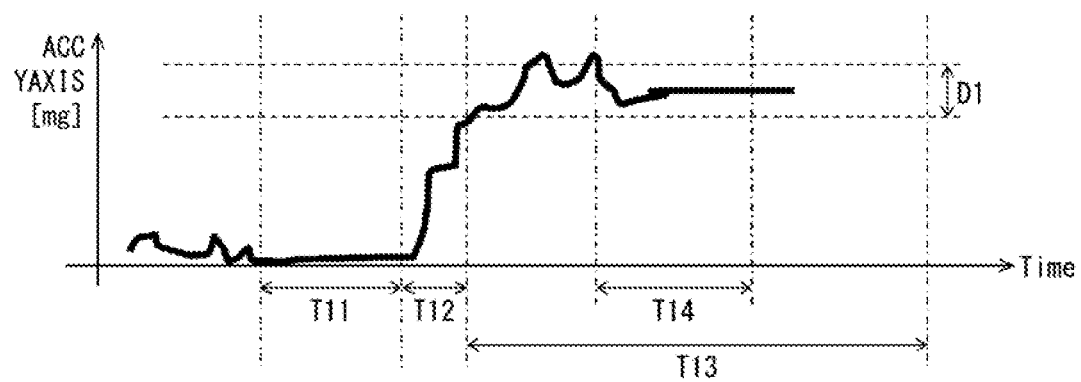
FIG. 6 is a diagram for explaining how lifting is detected in a mobile terminal in accordance with Embodiment 2 of the present invention.
Figure 7:
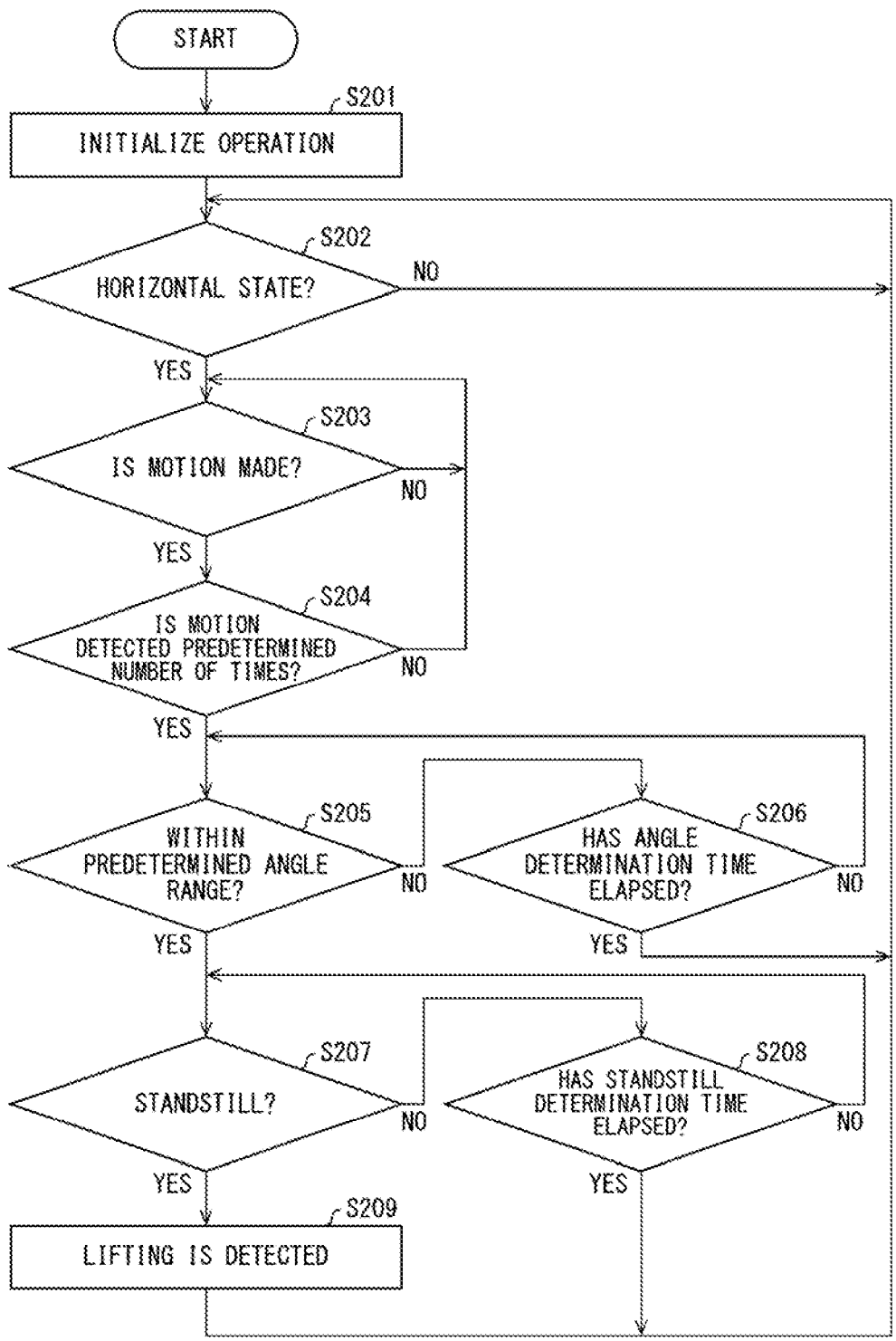
FIG. 7 is a flowchart illustrating a flow of a process in the mobile terminal.

The following will discuss Embodiment 2 of the present invention, with reference to FIGS. 6 and 7 Note that, for convenience of explanation, identical reference numerals are given to members which have respective functions identical with those described in Embodiment 1, and descriptions of the respective members are omitted.

Embodiment 2 will discuss a horizontal mode in which lifting determination is carried out in a case where an initial state of a mobile terminal 1 is a substantially horizontal state.

FIG. 6 is a diagram for explaining how to detect lifting in the horizontal mode. In the graph of FIG. 6, a horizontal axis represents time, and a vertical axis represents acceleration AY in a Y direction. In the horizontal mode, an angle determination section 62 determines, on the basis of the acceleration, that the mobile terminal 1 is in a horizontal state. Specifically, the angle determination section 62 determines that the mobile terminal 1 is in the horizontal state, in a case where −100 mg≤AY≤100 mg for a predetermined time period T11 (e.g., 2 seconds (s)) (in other words, an angle of a Y axis with respect to a horizontal plane is within a range of ±6°).

Next, in a case where (i) AX or AY is not less than 20 mg and (ii) AZ is not less than 30 mg for a predetermined time period 112 (e.g., 2 seconds (s)), an acceleration determination section 61 determines that there has been a motion which causes a state change of the mobile terminal 1 from the horizontal state. This determination may be carried out a predetermined number of times (e.g., two times). The predetermined number of times (plurality of times) of the determination makes it possible to remove oscillation noise. Note that in a case where the above conditions are not satisfied for the predetermined time period T12, a process of determination on the motion times out in the acceleration determination section 61.

Further, as in a normal mode described above, the angle determination section 62 determines whether or not a holding angle condition (conditions for determining a 45° state) is satisfied and a standstill determination section 63 determines whether or not a standstill condition is satisfied. Note that in FIG. 6, a period T13 indicates a time-out period (e.g., 2 seconds (s)) in a case where the standstill determination section 63 carries out the standstill determination, and a period T14 indicates a period in which the standstill determination section 63 carries out the standstill determination.

FIG. 7 is a flowchart illustrating a flow of a process (S201 to S209) of lifting detection in the mobile terminal 1. The following will briefly discuss the flow of that process, with reference to FIG. 7. Note that processing in S205 to S209 is similar to that in S105 to S109 above, and therefore explanations thereof will be omitted here.

In the horizontal mode, first, the control section 10 initializes an operation (S201). This initialization is a process for calculating a reference acceleration at the start of operation. For example, the initialization is carried out by obtaining an acceleration in each direction 40 times at intervals of 50 ms. Next, the angle determination section 62 determines whether or not the mobile terminal 1 is in the horizontal state (S202). In a case where the mobile terminal 1 is not in the horizontal state (NO in S202), the process goes back to S202.

In contrast, in a case where the mobile terminal 1 is in the horizontal state (YES in S202), the acceleration determination section 61 determines whether or not the above motion is made (S203). Then, in a case where the above motion is made (YES in S203), it is determined whether or not a determination condition concerning the motion is satisfied successively in a predetermined number of times of determination (S204). In a case where the determination condition concerning the motion is satisfied successively in the predetermined number of times of determination (YES in S204), the process proceeds to S205. Note that each determination condition in the horizontal mode may be less severely set than that in the normal mode. Then, in a case where the standstill condition is satisfied in S207 (YES in S207), the lifting determination section 64 detects lifting the mobile terminal 1 (S209).

As described above, in the horizontal mode, the lifting determination is carried out in a case where an initial state of the mobile terminal 1 is a substantially horizontal state. Then, in a case where the state of the mobile terminal 1 shifts from the substantially horizontal state in which the mobile terminal 1 is substantially parallel to a horizontal plane to a different state, it is highly likely that the mobile terminal 1 has been lifted. In the horizontal mode, it is possible to determine whether or not the mobile terminal 1 has been lifted, by carrying out lifting determination only in a case where an angle of the mobile terminal 1 shifts from an angle in the substantially horizontal state in which the mobile terminal 1 is substantially parallel to the horizontal plane to a different angle.

Embodiment 3

Figure 8:
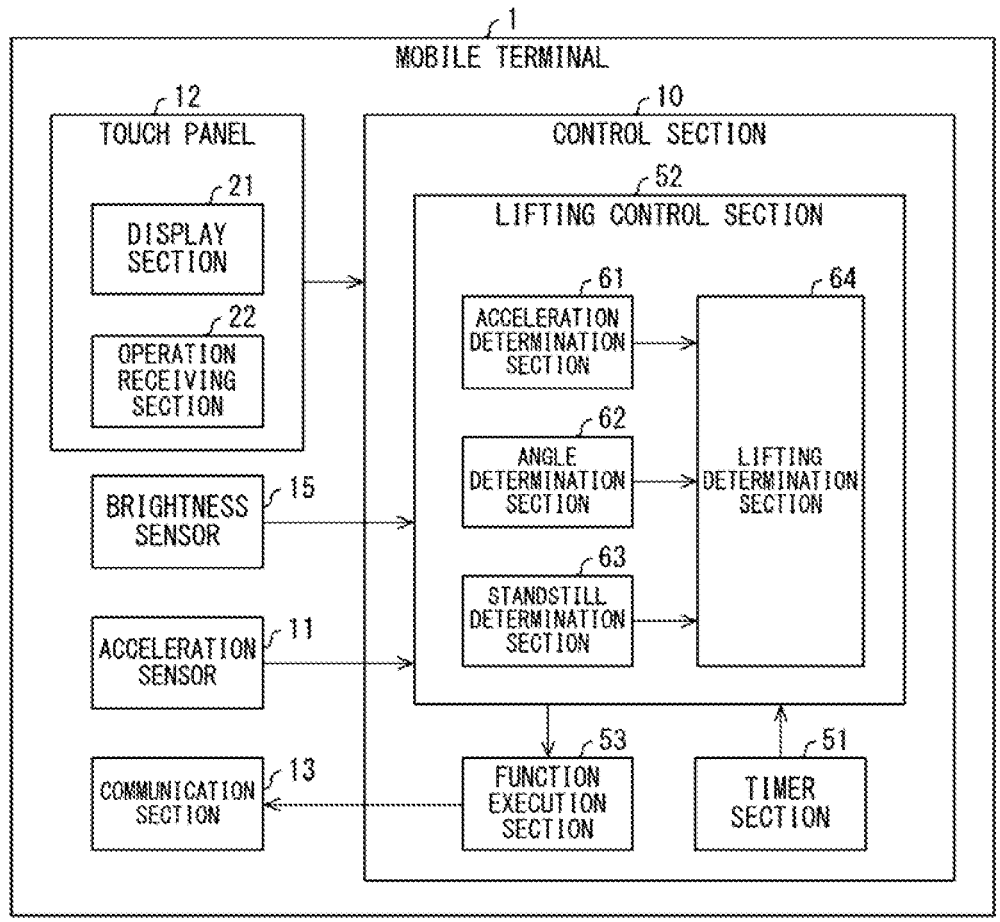
FIG. 8 is a block diagram illustrating a main part configuration of a mobile terminal in accordance with Embodiment 3 of the present invention.
Figure 9:
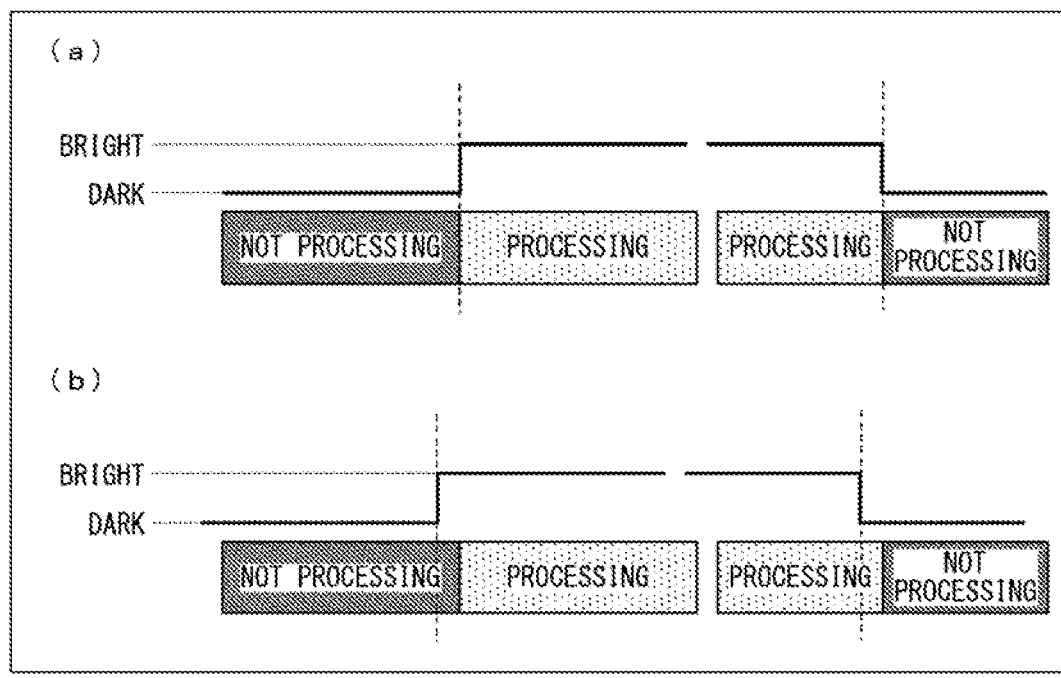
FIG. 9 is a diagram for explaining process in the mobile terminal.

The following will discuss Embodiment 3 of the present invention, with reference to FIGS. 8 and 9. Note that, for convenience of explanation, identical reference numerals are given to members which have respective functions identical with those described in Embodiment 1 or 2, and descriptions of the respective members are omitted.

FIG. 8 is a block diagram illustrating a main part configuration of a mobile terminal 1 in accordance with Embodiment 3. As illustrated in FIG. 8, in Embodiment 3, the mobile terminal 1 includes a brightness sensor 15 in addition to each of respective configurations of Embodiments 1 and 2 above. Further, in Embodiment 3, whether or not to carry out lifting determination is determined depending on a result of detection by the brightness sensor 15.

(a) and (b) of FIG. 9 illustrate a relation between detected brightness and whether or not a process of the lifting is carried out. In an example shown in (a) of FIG. 9, in a case where the brightness sensor 15 detects a brightness of not less than a predetermined value, the process of the lifting determination is carried out. In contrast, in a case where the brightness sensor 15 detects a brightness of less than the predetermined value, the process of the lifting determination is not carried out.

In a case where the brightness detected by the brightness sensor 15 is less than the predetermined value, a user is less likely to be in the vicinity of the mobile terminal 1. Therefore, it is considered that lifting of the mobile terminal 1 is less likely to occur. Therefore, in such a case, the process of the lifting determination is not carried out (stopped), so that it is possible to reduce a power consumption of the mobile terminal 1.

In an example shown in (b) of FIG. 9, after a short time from a time point at which the brightness sensor 15 detected a brightness of not less than the predetermined value, the lifting determination is carried out. Meanwhile, the process of the lifting determination is stopped after a short time from a time point at which the brightness sensor 15 detected a brightness of less than the predetermined value. This makes it possible to control whether or not to carry out the process of the lifting determination, in consideration of the occurrence of a false detection due to chattering or the like.

Note that it is also possible to cause a camera 92 or the like to function like the brightness sensor 15 of Embodiment 3, and to carry out the above process by use of the camera 92 or the like.

Embodiment 4

Figure 10:
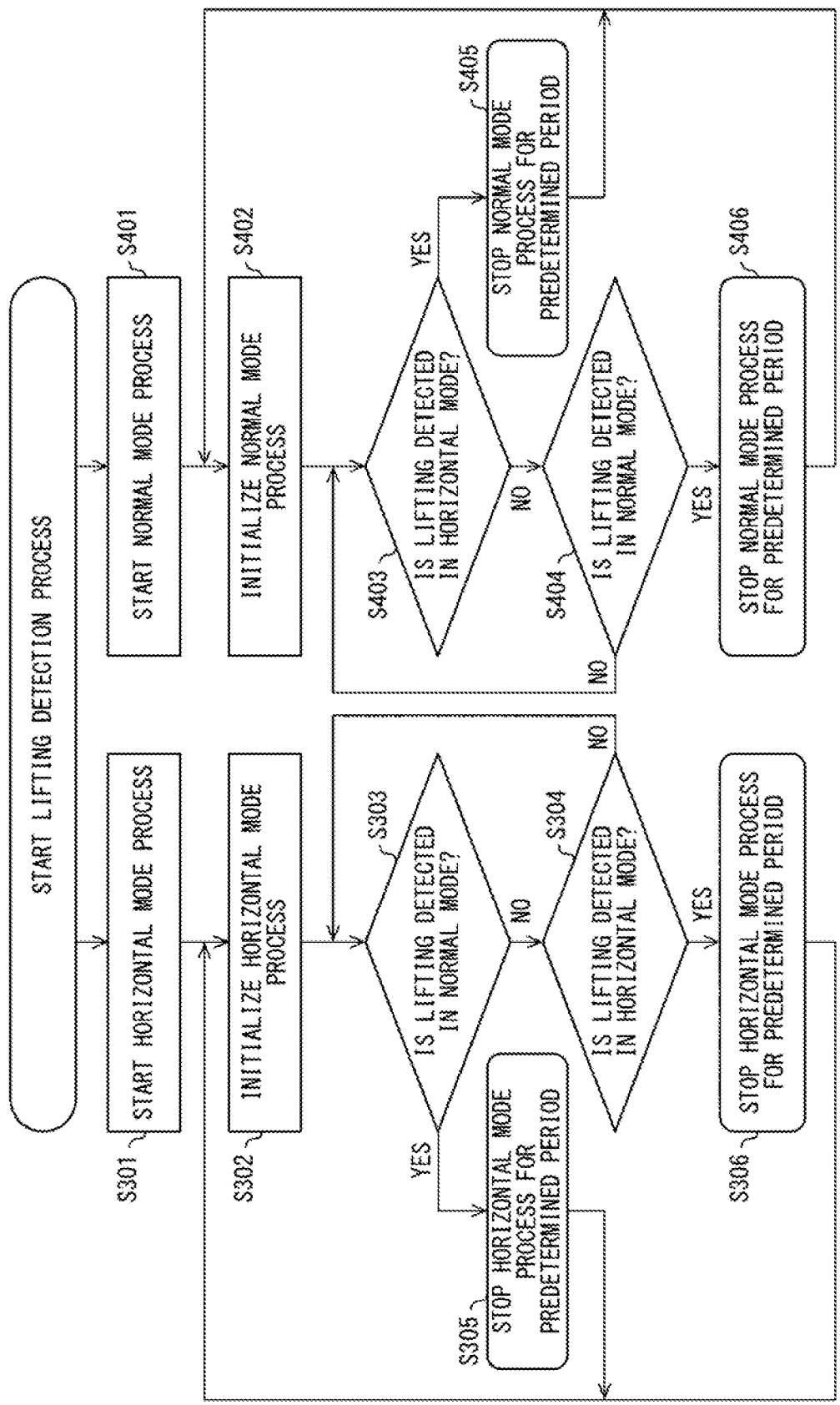
FIG. 10 is a flowchart illustrating a flow of a process in the mobile terminal in accordance with Embodiment 4 of the present invention.

The following will discuss Embodiment 4 of the present invention, with reference to FIG. 10. Note that, for convenience of explanation, identical reference numerals are given to members which have respective functions identical with those described in any of Embodiments 1 to 3, and descriptions of the respective members are omitted.

Embodiment 4 will discuss an example in which processing in a normal mode described in the above Embodiment 1 and processing in a horizontal mode described in the above Embodiment 2 are carried out in parallel.

The following will discuss a flow of a process in a case where the processing in the normal mode and the processing in the horizontal mode are carried out in parallel, with reference to FIG. 10. FIG. 10 is a flowchart illustrating a flow of a process in a case where the processing in the normal mode and the processing in the horizontal mode are carried out in parallel.

As illustrated in FIG. 10, in a case where a horizontal mode process is started (S301), first, the horizontal mode process is initialized (S302). Then, in a case where lifting is detected in a normal mode process (YES in S303), the horizontal mode process is stopped for a predetermined period (e.g., 2 seconds (s)) (S305) and the process goes back to S302. In contrast, in a case where (i) lifting is not detected in the normal mode process in S303 (NO in S303) but lifting is detected in the horizontal mode process (YES in S304), the horizontal mode process is stopped for a predetermined period (e.g., 2 seconds (S306) and the process goes back to S302.

Further, in a case where the normal mode process is started (S401), first, the normal mode process is initialized. (S402). Then, in a case where lifting is detected in the horizontal mode process (YES in S403), the normal mode process is stopped for a predetermined period (e.g., 2 seconds (s)) (S405) and the process goes back to S402. In contrast, in a case where (i) lifting is not detected in the horizontal mode process in S403 (NO in S403) but (ii) lifting is detected in the normal mode process (YES in S404), the normal mode process is stopped for a predetermined period (e.g., 2 seconds (s)) (S406) and the process goes back to S402.

When lifting is detected in either one of the normal mode process and the horizontal mode process in a case where the normal mode process and the horizontal mode process are carried out in parallel, the lifting determination process carried out in the other one of the normal mode process and the horizontal mode process is initialized. This makes it possible to prevent the lifting determination process from being carried out by the other mode process. Further, a malfunction (a false detection) can be prevented in each mode by stopping the process in that mode for a predetermined period before initialization.

Embodiment 5

Control blocks of the mobile terminal 1 (particularly, a control section 10 (a timer section 51, a lifting control section 52 (an acceleration determination section 61, an angle determination section 62, a standstill determination section 63, and a lifting determination section 64), and a function execution section 53)) may be realized by a logic circuit (hardware) provided in an integrated circuit (IC chip) or the like or may be realized by software as executed by a CPU (Central Processing Unit).

In the latter case, the mobile terminal 1 includes: a CPU that executes instructions of a program that is software realizing the foregoing functions; a Read Only Memory (ROM) or a storage device (each referred to as "storage medium") storing the program and various kinds of data in such a form that they are readable by a computer (or a CPU); and a Random Access Memory (RAM) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Recap]

An information processing device in accordance with Aspect 1 of the present invention is an information processing device (control section 10) mounted on an electronic device (mobile terminal 1), including: a standstill determination section for determining whether or not a predetermined standstill condition is satisfied, on the basis of an acceleration detected by an acceleration sensor provided in the electronic device; and a lifting determination section for determining whether or not the electronic device has been lifted, the standstill determination section determining that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state (that is, a state in which the acceleration is zero), and the lifting determination section determining that the electronic device has been lifted, in a case where, after the acceleration satisfies a predetermined lifting acceleration condition, the standstill determination section determines that the standstill condition is satisfied.

For example, there is a case where, immediately after a user takes the electronic device in his/her hand, the user puts the electronic device terminal on a target object such as a desk without operating the electronic device. In this case, it has been difficult conventionally to determine whether the electronic device is held in the hand of the user or placed on the target object. Accordingly, there has been a possibility that in a case where a user places the electronic device on a target object immediately after the user takes the electronic device in his/her hand, a false detection may occur in which false detection it is determined that the electronic device has been lifted.

In a state in which the electronic device is held in hand, the electronic device is not in a complete standstill state because of oscillations etc. transmitted from the hand. In contrast, in a state in which the electronic device is put on a target object, the electronic device is in a substantially complete standstill state.

In the above configuration, the standstill determination section determines that the standstill condition is satisfied in a case where a dispersion of the acceleration detected by the acceleration sensor is (i) within the predetermined standstill reference range and (ii) outside the predetermined complete standstill reference range. Accordingly, in a case where, for example, a user places the electronic device on a target object immediately after the user takes the electronic device in his/her hand, the acceleration is within the complete standstill reference range and does not satisfy the standstill condition. Then, in such a case, the lifting determination section determines that the electronic device has not been lifted.

Therefore, the above configuration makes it possible to decrease the possibility of a false detection which causes a function associated with lifting to be activated at a time which is not intended by a user. This can lead to a decreased power consumption of the electronic device.

An information processing device in accordance with Aspect 2 of the present invention is an information processing device mounted on an electronic device, including: an impact determination section (acceleration determination section 61) for determining whether or not a predetermined non-impact acceleration condition is satisfied, on the basis of an acceleration detected by an acceleration sensor provided in the electronic device; and a lifting determination section for determining whether or not the electronic device has been lifted, the impact determination section determining that the non-impact acceleration condition is satisfied, in a case where the acceleration is within a predetermined non-impact reference range, and the lifting determination section determining that the electronic device has been lifted, in a case where (i) the acceleration satisfies a predetermined lifting acceleration condition and (ii) the impact determination section determines that the non-impact acceleration condition is satisfied.

When a lifting motion of the electronic device is detected by the acceleration sensor, it has been difficult conventionally to determine whether the acceleration detected by the acceleration sensor is caused by a motion made by a user to lift the electronic device or caused by an impact which occurs when the electronic device falls or when the electronic device is placed on a desk or the like. Accordingly, there has been a possibility that in a case where the electronic device is subject to an impact due to a fall of the electronic device or the like, a false detection may occur in which false detection it is determined that the electronic device has been lifted.

In the above configuration, the impact determination section determines whether or not the non-impact acceleration condition is satisfied. The non-impact acceleration condition is a condition for determining whether the acceleration detected by the acceleration sensor is caused by an impact due to a fall or the like of the electronic device. Accordingly, in a case where, for example, the electronic device is subject to a high impact caused by a fall of the electronic device, or the like, the acceleration is outside the non-impact acceleration reference range and does not satisfy the non-impact acceleration condition. Then, the lifting determination section determines that the electronic device has not been lifted.

Therefore, the above configuration makes it possible to decrease the possibility of a false detection which causes a function associated with lifting to be activated at a time which is not intended by a user. This can lead to a decreased power consumption of the electronic device.

An information processing device in accordance with Aspect 8 of the present invention is an information processing device mounted on an electronic device, including: an initial angle determination section (angle determination section 62) for determining whether or not an angle of a display surface (display section 21) of the electronic device with respect to a horizontal plane satisfies a predetermined initial angle condition, on the basis of an acceleration detected by an acceleration sensor provided in the electronic device; an initial standstill determination section (standstill determination section 63) for determining, on the basis of the acceleration, whether or not a predetermined initial standstill condition is satisfied; and a lifting determination section for determining whether or not the electronic device has been lifted, the initial standstill determination section determining that the initial standstill condition is satisfied, in a case where a dispersion of the acceleration is within a predetermined initial standstill reference range, and the lifting determination section carrying out a process for determining whether or not the electronic device has been lifted, in a case where the initial angle condition and the initial standstill condition are satisfied.

For example, in a case where the electronic device is carried in a bag or the like, a change in posture of the electronic device may occur due to successive oscillations caused by walking etc. In such a case, there has conventionally been a possibility that a motion of the change in posture may result in a false detection in which it is determined that the electronic device has been lifted.

In the above configuration, the lifting determination section carries out a process for determining whether or not the electronic device has been lifted, in a case where the initial angle condition and the initial standstill condition are satisfied. Even if the initial angle condition is satisfied, the initial standstill condition is not satisfied in a case where the dispersion of the acceleration is outside the predetermined initial standstill reference range. Accordingly, in such a case, the lifting determination section does not carry out the process for determining whether or not the electronic device has been lifted.

Therefore, the above configuration makes it possible to decrease the possibility of a false detection which causes a function associated with lifting to be activated at a time which is not intended by a user. This can lead to a decreased power consumption of the electronic device.

An information processing device in accordance with Aspect 4 of the present invention may be the information processing device as described in any one of Aspects 1 to 3 above, further including: an acceleration determination section for determining, on the basis of the acceleration, whether or not a predetermined lifting acceleration condition is satisfied, the acceleration determination section determining that the predetermined lifting acceleration condition is satisfied in a case where (i) there are a maximum value and a minimum value in a waveform showing the acceleration over time, (ii) the acceleration is higher than a first predetermined value for a first predetermined time period including a time point at which the acceleration is the maximum value, and (iii) the acceleration is lower than a second predetermined value for a second predetermined time period including a time point at which the acceleration is the minimum value.

When a lifting motion of the electronic device is made, the acceleration increases at the time when the electronic device is lifted, and the acceleration once decreases after the lifting. In light of this, in the above configuration, the acceleration determination section determines that the lifting acceleration condition is satisfied in a case where (i) there are a maximum value and a minimum value in a waveform showing the acceleration over time, (ii) the acceleration is higher than a first predetermined value for a first predetermined time period including a time point at which the acceleration is the maximum value, and (iii) the acceleration is lower than a second predetermined value for a second predetermined time period including a time point at which the acceleration is the minimum value. In other words, the acceleration determination section determines that the lifting acceleration condition is satisfied, in a case where the acceleration determination section detects an increase of the acceleration (the acceleration becomes higher than the first predetermined value) and a decrease of the acceleration (the acceleration becomes lower than the first predetermined value).

Therefore, the above configuration makes it possible to appropriately carry out lifting determination since it is possible to precisely detect a change in acceleration in a case where the electronic device has been lifted.

An information processing device in accordance with Aspect 5 of the present invention may be the information processing device as described in Aspect 4 above, further including: an angle calculation section (angle determination section 62) for calculating, on the basis of the acceleration, an angle of a display surface of the electronic device with respect to a horizontal plane, the lifting determination section determining that the electronic device has been lifted, in a case where, after the predetermined lifting acceleration condition is satisfied, the angle calculated by the angle calculation section is within a predetermined angle range.

In a case where a user lifts the electronic device and views the display surface, the display surface of the electronic device is caused to face the user in such a manner that the display surface is inclined at an angle with respect to the horizontal plane (i.e., the display surface is not parallel to the horizontal plane). In the above configuration, the lifting determination section determines that the electronic device has been lifted, in a case where not only (i) the lifting acceleration condition is satisfied but also (ii) the angle of the display surface is in the predetermined angle range.

Therefore, the above configuration makes it possible to carry out the lifting determination more precisely.

An information processing device in accordance with Aspect 6 of the present invention is an information processing device mounted on an electronic device, including: a horizontality determination section (angle determination section 62) for determining whether or not a display surface of the electronic device is at an angle in a state in which the display surface is substantially parallel to the horizontal plane, on the basis of an acceleration detected by an acceleration sensor provided in the electronic device; a standstill determination section for determining, on the basis of the acceleration, whether or not a predetermined standstill condition is satisfied; and a lifting determination section for determining whether or not the electronic device has been lifted, the standstill determination section determining that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state, and the lifting determination section determining that the electronic device has been lifted, in a case where, after the angle changes from the angle in the state in which the display surface is substantially parallel to the horizontal plane to a different angle, the standstill determination section determines that the standstill condition is satisfied.

In a case where the state of the electronic device shifts from a state in which the electronic device is substantially parallel to a horizontal plane to a different state, it is highly likely that the electronic device has been lifted. In the above configuration, the standstill determination section determines that the standstill condition is satisfied in a case where, after the angle of the electronic device changes from the angle in the state in which the electronic device is substantially parallel to the horizontal plane to a different angle, a dispersion of the acceleration detected by the acceleration sensor is (i) within the predetermined standstill reference range and (ii) outside the predetermined complete standstill reference range. Accordingly, for example, in a case where a user places the electronic device on a target object immediately after the user takes the electronic device in his/her hand, the acceleration is within the complete standstill reference range and does not satisfy the standstill condition. Then, in such a case, the lifting determination section determines that the electronic device has not been lifted.

Therefore, the above configuration makes it possible to decrease the possibility of a false detection which causes a function associated with lifting to be activated at a time which is not intended by a user. This can lead to a decreased power consumption of the electronic device.

An electronic device in accordance with Aspect 7 of the present invention is an electronic device including: an information processing device described in any one of Aspects 1 to 6 above; an acceleration sensor for detecting an acceleration; and a display surface for displaying an image.

The above configuration makes it possible to prevent a function associated with lifting from being activated at a time which is not intended by a user. This can lead to a decreased power consumption of the electronic device.

A control method in accordance with Aspect 8 of the present invention is a method for controlling an information processing device mounted on an electronic device, including: a standstill determination step of determining whether or not a predetermined standstill condition is satisfied, on the basis of an acceleration detected by an acceleration sensor provided in the electronic device; and a lifting determination step of determining whether or not the electronic device has been lifted, in the standstill determination step, it being determined that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state, and in the lifting determination step, it being determined that the electronic device has been lifted, in a case where, after the acceleration satisfies a predetermined lifting acceleration condition, it is determined in the standstill determination step that the standstill condition is satisfied.

According to the above method, in the standstill determination step, it is determined that the standstill condition is satisfied in a case where a dispersion of the acceleration detected by the acceleration sensor is (i) within the predetermined standstill reference range and (ii) outside the predetermined complete standstill reference range. Accordingly, for example, in a case where a user places the electronic device on a target object immediately after the user takes the electronic device in his/her hand, the acceleration is within the complete standstill reference range and does not satisfy the standstill condition. Then, in such a case, it is determined in the lifting determination step that the electronic device has not been lifted.

Therefore, the above method makes it possible to decrease the possibility of a false detection which causes a function associated with lifting to be activated at a time which is not intended by a user. This can lead to a decreased power consumption of the electronic device.

The information processing device in accordance with each aspect of the present invention may be realized by a computer. In this case, the scope of the present invention encompasses a control program for the information processing device which program realizes the information processing device by the computer by causing the computer to operate as each section (software element) of the information processing device, and a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1 mobile terminal (electronic device)
11 acceleration sensor
21 display section (display surface)
52 lifting control section (information processing device)
61 acceleration determination section (impact determination section)
62 angle determination section (initial angle determination section, angle calculation section, horizontality determination section)
63 standstill determination section (initial standstill determination section)
64 lifting determination section
S107 standstill determination step
S109 lifting determination step

The invention claimed is:

1. An information processing device mounted on an electronic device, comprising:
   a standstill determination section for determining whether or not a predetermined standstill condition is satisfied, on the basis of an acceleration detected by an acceleration sensor provided in the electronic device; and
   a lifting determination section for determining whether or not the electronic device has been lifted,
   the standstill determination section determining that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state,
   the lifting determination section determining that the electronic device has been lifted, in a case where, after the acceleration satisfies a predetermined lifting acceleration condition, the standstill determination section determines that the standstill condition is satisfied,
   the predetermined standstill reference range being within 40 mg (milli-gravitational acceleration),
   the predetermined complete standstill reference range being a range of not less than 0 mg and less than 15 mg, and
   the predetermined standstill reference range and the predetermined complete standstill reference range being for determining whether the electronic device is held in a hand of a user or placed on a target object.

2. An information processing device mounted on an electronic device, comprising:
   an impact determination section for determining whether or not a predetermined non-impact acceleration condition is satisfied, on the basis of an acceleration detected by an acceleration sensor provided in the electronic device; and
   a lifting determination section for determining whether or not the electronic device has been lifted,
   the impact determination section determining that the non-impact acceleration condition is satisfied, in a case where the acceleration is within a predetermined non-impact reference range, and
   the lifting determination section determining that the electronic device has been lifted, in a case where (i) the acceleration satisfies a predetermined lifting acceleration condition and (ii) the impact determination section determines that the non-impact acceleration condition is satisfied,
   the predetermined non-impact reference range being a range of less than 1500 mg (milli-gravitational acceleration), and
   the predetermined non-impact reference range being for determining whether the acceleration detected by the acceleration sensor is caused by a motion made by a user to lift the electronic device or caused by an impact involving the electronic device.

3. An information processing device mounted on an electronic device, comprising:
an initial angle determination section for determining whether or not an angle of a display surface of the electronic device with respect to a horizontal plane satisfies a predetermined initial angle condition, on the basis of an acceleration detected by an acceleration sensor provided in the electronic device;
an initial standstill determination section for determining, on the basis of the acceleration, whether or not a predetermined initial standstill condition is satisfied; and
a lifting determination section for determining whether or not the electronic device has been lifted,
the initial standstill determination section determining that the initial standstill condition is satisfied, in a case where a dispersion of the acceleration is within a predetermined initial standstill reference range, and
the lifting determination section carrying out a process for determining whether or not the electronic device has been lifted, in a case where the initial angle condition and the initial standstill condition are satisfied,
the predetermined initial standstill reference range being a range of not more than 100 mg (milli-gravitational acceleration),
the predetermined initial standstill reference range being for determining whether (i) a change in posture of the electronic device has occurred due to successive oscillations caused by motion of a user or (ii) the user has lifted the electronic device.

4. The information processing device as set forth in claim 1, further comprising:
an acceleration determination section for determining, on the basis of the acceleration, whether or not a predetermined lifting acceleration condition is satisfied,
the acceleration determination section determining that the predetermined lifting acceleration condition is satisfied in a case where (i) there are a maximum value and a minimum value in a waveform showing the acceleration over time, (ii) the acceleration is higher than a first predetermined value for a first predetermined time period including a time point at which the acceleration is the maximum value, and (iii) the acceleration is lower than a second predetermined value for a second predetermined time period including a time point at which the acceleration is the minimum value.

5. The information processing device as set forth in claim 4, further comprising:
an angle calculation section for calculating, on the basis of the acceleration, an angle of a display surface of the electronic device with respect to a horizontal plane,
the lifting determination section determining that the electronic device has been lifted, in a case where, after the predetermined lifting acceleration condition is satisfied, the angle calculated by the angle calculation section is within a predetermined angle range.

6. An information processing device mounted on an electronic device, comprising:
a horizontality determination section for determining whether or not a display surface of the electronic device is at an angle in a state in which the display surface is substantially parallel to the horizontal plane, on the basis of acceleration detected by an acceleration sensor provided in the electronic device;
a standstill determination section for determining, on the basis of the acceleration, whether or not a predetermined standstill condition is satisfied; and
a lifting determination section for determining whether or not the electronic device has been lifted,
the standstill determination section determining that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state,
the lifting determination section determining that the electronic device has been lifted, in a case where, after the angle changes from the angle in the state in which the display surface is substantially parallel to the horizontal plane to a different angle, the standstill determination section determines that the standstill condition is satisfied,
the predetermined standstill reference range being within 40 mg (milli-gravitational acceleration),
the predetermined complete standstill reference range being a range of not less than 0 mg and less than 15 mg, and
the predetermined standstill reference range and the predetermined complete standstill reference range being for determining whether the electronic device is held in a hand of a user or placed on a target object.

7. An electronic device comprising:
an information processing device recited in claim 1;
an acceleration sensor for detecting an acceleration; and
a display surface for displaying an image.

8. A method for controlling an information processing device mounted on an electronic device, comprising:
a standstill determination step of determining whether or not a predetermined standstill condition is satisfied, on the basis of an acceleration detected by an acceleration sensor provided in the electronic device; and
a lifting determination step of determining whether or not the electronic device has been lifted,
in the standstill determination step, it being determined that the standstill condition is satisfied in a case where a dispersion of the acceleration is (i) within a predetermined standstill reference range and (ii) outside a predetermined complete standstill reference range which includes an acceleration in a state in which the electronic device is in a complete standstill state, and
in the lifting determination step, it being determined that the electronic device has been lifted, in a case where, after the acceleration satisfies a predetermined lifting acceleration condition, it is determined in the standstill determination step that the standstill condition is satisfied,
the predetermined standstill reference range being within 40 mg (milli-gravitational acceleration),
the predetermined complete standstill reference range being a range of not less than 0 mg and less than 15 mg, and
the predetermined standstill reference range and the predetermined complete standstill reference range being for determining whether the electronic device is held in a hand of a user or placed on a target object.

9. The information processing device as set forth in claim 1,
wherein in a case where a brightness detected by a brightness sensor mounted on the electronic device is less than a third predetermined value, a process of the lifting determination section is stopped.

* * * * *